United States Patent [19]
Takada et al.

[11] Patent Number: 5,936,779
[45] Date of Patent: Aug. 10, 1999

[54] LENS SYSTEM

[75] Inventors: Katsuhiro Takada, Hidaka; Takanori Yamanashi, Kokubunji, both of Japan

[73] Assignee: Olympus Optical Co., Ltd., Tokyo, Japan

[21] Appl. No.: 09/060,182

[22] Filed: Apr. 15, 1998

[30] Foreign Application Priority Data

Oct. 31, 1997 [JP] Japan .................................. 9-314606

[51] Int. Cl.⁶ .................................................. G02B 15/14
[52] U.S. Cl. ........................................................ 359/691
[58] Field of Search .................................... 359/691, 692

[56] References Cited

U.S. PATENT DOCUMENTS

| | | | |
|---|---|---|---|
| 3,926,506 | 12/1975 | Maeda | 359/751 |
| 5,418,648 | 5/1995 | Ono | 359/692 |

FOREIGN PATENT DOCUMENTS

| | | |
|---|---|---|
| 61-200519 | 9/1986 | Japan . |
| 2-118507 | 5/1990 | Japan . |
| 5-134174 | 5/1993 | Japan . |
| 7-248447 | 9/1995 | Japan . |

*Primary Examiner*—Georgia Epps
*Assistant Examiner*—Ricky Mack
*Attorney, Agent, or Firm*—Pillsbury Madison & Sutro LLP

[57] ABSTRACT

A telephoto lens system consisting of a front lens group and a rear lens group: the front lens group being composed of a first lens unit which is composed only of a positive lens components and a second lens unit which is composed only of negative lens components, and the rear lens group being composed of a third positive lens unit, a fourth negative lens unit and a fifth positive lens unit. This lens system has a back focal length long enough to permit disposing filters such as a low pass filter and optical path splitting members.

19 Claims, 5 Drawing Sheets

LENS SYSTEM

BACKGROUND OF THE INVENTION a) Field of the Invention

The present invention relates to a lens system which has a field angle on the order of 20° to 40° and an F number on the order of 2.8, and is suited for use with the so-called electronic cameras and video cameras which use image pickup tubes and solid state image pickup devices.

b) Description of the Prior Art

Since the so-called electronic cameras, video cameras and the like which use image pickup tubes, image pickup devices and the like require disposing optical members such as low pass filters and infrared cut filters between lens systems and image pickup surfaces, lens systems to be used with these cameras must have back focal lengths which are long as compared with focal lengths thereof.

In case of an image pickup system which uses the so called color separating optical system for picking up three colors of RGB with a plurality of image pickup devices to improve qualities of colored images above all, it is necessary to interpose, in addition to the optical members mentioned above, optical elements such as mirrors and prisms for splitting an optical path, whereby a lens system must have a longer back focal length.

Therefore, a photographic lens system except for one which has a long focal length in particular, generally adopts the so-called retrofocus type composition which has a negative power and a positive power in order from the object side. Further, most of a silver salt cameras adopt telephoto type lens systems or those which have refractive power distributions symmetrical with regard to stops. This applies also to lens systems which have field angles on the order of 20° to 40°.

Lens systems disclosed by Japanese Patents Kokai Publication No. Sho 61-200519, Kokai Publication No. Hei 2-118507, Kokai Publication No. Hei 5-134174 and Kokai Publication No. Hei 7-248447, for example, are known as conventional examples of lens systems which have the retrofocus type composition.

In the recent years where progresses have been made in manufacturing technologies, image pickup devices which are used in electronic cameras and video cameras have been shifting from image pickup tubes mainly to solid-state image pickup devices and there are now used solid-state image pickup devices on which pixels are arranged in numbers remarkably large as compared with sizes thereof.

Accordingly, cameras which use solid-state image pickup devices are now used for printing purposes though these cameras were not used conventionally for a reason that images obtained with these cameras were lower in qualities thereof than those of images obtained with silver salt cameras. However, it is difficult to manufacture a compact image pickup device which is to be used for these purposes even with the recent manufacturing technologies since it requires pixels in a number equal or larger than that of pixels specified by standards for highly precise televisions such as highvision which forms highly minute images. Under these circumstances, there have been developed image pickup devices which are enlarged and have larger number of pixels remaining unchanged in a size thereof as well as electronic cameras which uses these image pickup devices.

However, the enlarged image pickup devices have a defect that they can be manufactured in a smaller number from a wafer which has a definite area thereby requiring a higher manufacturing prime cost. Accordingly, there is a strong demand to accomplish both a compact configuration and a reduction of manufacturing costs at the same time by developing an image pickup device which is compact and has a large number of pixels.

However, a reduction in a size of pixels to be arranged on an image pickup device results in enhancement of the so-called Nyquist frequency, thereby producing a demand for extremely high optical performance of photographic lens systems.

On the other hand, the electronic cameras and video cameras which use electronic image pickup devices require lens systems having long back focal lengths, thereby obliging to select the retrofocus type composition which consists, in order from the object side, of a front negative lens group and a rear positive lens group, or has a power distribution asymmetrical with regard to a stop, thereby making it difficult to correct offaxial aberrations such as distortion and astigmatism. Further, since the front negative lens group diverges an axial light bundle, the rear positive lens group produces remarkable spherical aberration, thereby making it difficult to obtain a bright lens system.

Further, as the retrofocus type lens system has a longer back focal length, refractive powers of the negative front lens group and the positive rear lens group must be strengthened, thereby making it more difficult to correct the aberrations mentioned above.

Furthermore, color reproducibility and color moire are more problematic as images have higher qualities. Therefore, a multi-plate type camera represented by the so-called three-plate type camera which picks up the three primary colors RGB with the three image pickup devices is more desirable than the so-called single-plate type camera which uses an image pickup device having color filters arranged thereon in a mosaic or stripes.

For this reason, it is necessary to interpose the so-called color separating optical system between a photographic lens system and the image pickup devices, and the photographic lens system must have a longer back focal length, thereby making it more difficult to design the lens system.

Spherical aberration and chromatic aberration are not corrected sufficiently in the lens systems disclosed by Japanese Patents Kokai Publication No. Sho 61-200519, Kokai Publication No. Hei 2-118507 and Hei 5-134174. The lens system disclosed by Japanese Patent Kokai Publication No. Hei 7-248447 has remarkably high optical performance, but is extremely large and contrary to the purpose described above to configure image pickup systems compact while maintaining a compact size of image pickup devices.

SUMMARY OF THE INVENTION

A primary object of the present invention is to provide a relatively compact lens system which has a field angle on the order of 20° to 40°, an F number on the order of 2.8, a back focal length long enough to permit disposing not only various types of optical members such as low pass filters and infrared cut filters but also optical path splitting members between the lens system and image pickup devices for forming images in the three primary colors RGB with a plurality of image pickup devices, and extremely high optical performance optimum for use with electronic cameras, video cameras and the like which use compact image pickup devices having large numbers of compact pixels arranged thereon.

The lens system according to the present invention consists, in order from the object side, of a front lens group which has a negative refractive power as a whole and a rear lens group which has a positive refractive power as a whole: the front lens group being composed, in order from the object side, of a first lens unit which is composed only of a positive lens component or positive lens components and a second lens unit which is composed only of a negative lens component or negative lens components, the rear lens group being composed, in order from the object side, of a third lens unit which has a positive refractive power as a whole, a fourth lens unit which has a negative refractive power as a whole and a fifth lens unit which has a positive refractive power as a whole: and the lens system satisfies the following conditions (1), (2) and (3):

$$0.3 < |f_F/f_R| < 1.5 \quad (1)$$

$$0.05 < |f_R/f_4| < 0.8 \quad (2)$$

$$0.8 < |f_5/f_R| < 1.5 \quad (3)$$

DETAILED DESCRIPTION OF THE PREFERRED EMBODIMENTS

Figure 1:
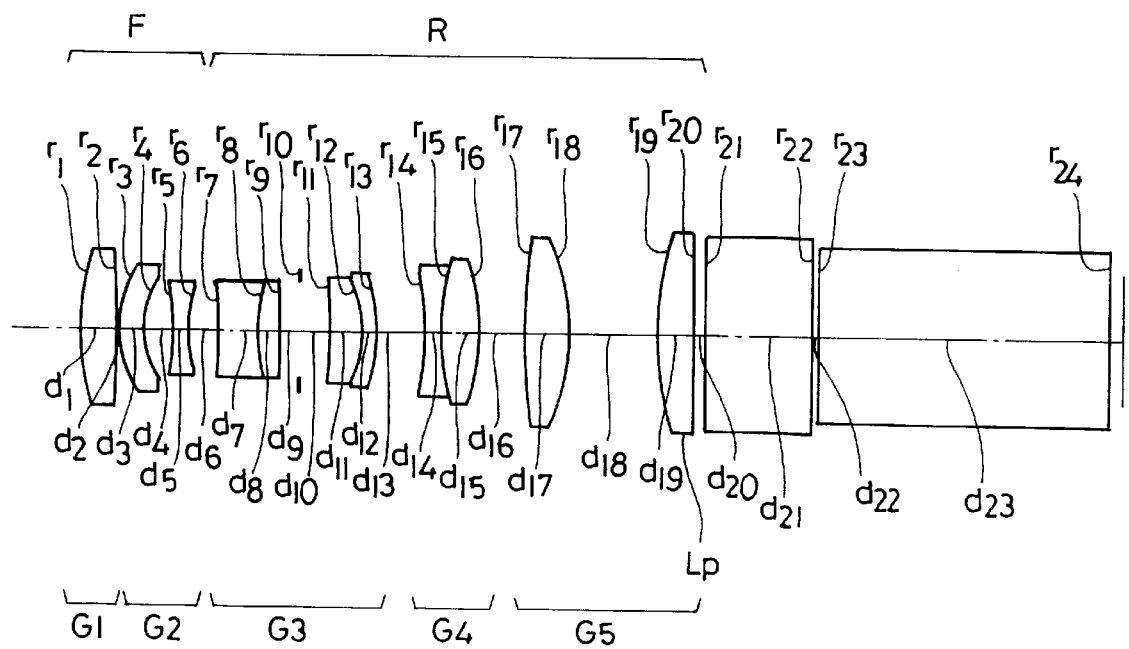
FIGS. 1 through 9 show sectional views illustrating compositions of first through ninth embodiments of the lens system according to the present invention.

The lens system according to the present invention has a composition illustrated in FIG. 1 for example, or consists, in order from the object side, of a front lens group F which has a negative refractive power as a whole and a rear lens group R which has a positive refractive power as a whole: the front lens group F being composed, in order from the object side, of a first lens unit G1 which is composed only of a positive lens component or positive lens components and a second lens unit G2 which is composed only of a negative lens component or negative lens components, and the rear lens group R being composed, in order from the object side, of a third lens unit G3 which has a positive refractive power as a whole, a fourth lens unit G4 which has a negative refractive power as a whole and a fifth lens unit G5 which has a positive refractive power as a whole: and the lens system satisfies the following conditions (1), (2) and (3):

$$0.3 < |f_F/f_R| < 1.5 \quad (1)$$

$$0.05 < |f_R/f_4| < 0.8 \quad (2)$$

$$0.8 < |f_5/f_R| < 1.5 \quad (3)$$

wherein the reference symbols $f_F$ and $f_R$ represent focal lengths of the front lens group F and the rear lens group R respectively, and the reference symbols $f_4$ and $f_5$ designate focal lengths of the fourth lens unit G4 and the fifth lens unit G5 respectively of the rear lens group R.

When a color separating optical system such as a color separating prism is used, it is general to perform color separations using a light transmissive dichroic film which controls wavelength spectra for efficient use of rays. However, wavelength spectra which transmit through the dichroic film are different dependently on inclinations of rays incident on the dichroic film. It is therefore desirable for obtaining uniform color separations within a screen to nearly equalize inclinations of light bundles incident on the color separating optical system at different locations within the screen. In other words, it is desirable that an offaxial principal ray is incident on the color separating optical system at an angle which is the same as that of an optical axis and that an offaxial light bundle have a spread which is revolutionally symmetrical with regard to the principal ray.

It is therefore desirable that a photographic lens system has an exit pupil nearly at an infinite distance, but color signals which are not problematic for practical use can be obtained by disposing the so-called white shading correcting circuit after receiving the light bundle with an image pickup device so far as the photographic lens system has an exit pupil located at a distance which is adequately long.

Unlike a silver salt camera or the like, an electronic image pickup device allows rays to be imaged on a photoelectric conversion surface of each pixel through members such as a color filter disposed at an adequate interval from the photoelectric conversion surface and a micro lens for efficient condensation of rays, and the photoelectric conversion surface and each of the members correspond at 1:1 to each other for each pixel. When a center ray of a light bundle is incident obliquely onto the image pickup device at an inclination angle of incidence which is extremely large as compared with a size of each pixel and the interval between the member and the photoelectric conversion surface, a light bundle or a portion thereof which has passed through the member protrudes from the photoelectric conversion surface corresponding to the member and does not contribute to conversion into an electric signal or incident another pixel, thereby producing ununiformity in brightness or spurious colors.

For correcting the defect described above, there is adopted means which produces an adequate deviation between the optical member and the pixel corresponding thereto dependently on a location of the exit pupil of the photographic lens system. Though this means controls angles of emergence of rays by locating the exit pupil of within an adequate range, a location of an exit pupil which is extremely close to an image surface imposes stricter design restrictions and is undesirable when an image pickup device which is to be used versatilely is to be manufactured or when photographic lens systems are to be used in exchange in a camera.

When versatility is taken into consideration, it is desirable to allow a light bundle to be incident on an electronic image pickup device so that its center ray has an inclination angle not exceeding an adequate angle. In other words, it is desirable to configure a photographic lens system so as to have an exit pupil which is located at an adequately long distance.

Due to the requisites for the color separating optical system and the requirements for the image pickup device described above, it is desirable to locate an exit pupil of a photographic lens system at a position which is located at a nearly infinite distance or an adequately long distance. It is therefore necessary to adequately strengthen a positive refractive power of a rear lens group when a retrofocus type which consists of a negative front lens group and a positive rear lens group is adopted as a photographic lens system.

An object of the present invention is to provide a lens system which has a long back focal length so that a color separating optical system or the like which splits an optical path for a plurality of image pickup devices can be interposed between the photographic lens system and the image pickup devices, for example, as shown in FIG. 1.

Accordingly, the lens system according to the present invention has a retrofocus type composition and a back focal length which is prolonged without prolonging a total length of the lens system. As apparent from a simple paraxial theory, it is necessary for obtaining such a lens system to strengthen the negative refractive power of the front lens group and the positive refractive power of the rear lens group.

From viewpoints of any of the characteristics of the color separating optical system, the structure of the electronic image pickup device and the paraxial condition, it is necessary to strengthen both the negative refractive power of the front lens group and the positive refractive power of the rear lens group.

Though the primary object of the present invention is to provide an optical system and an image pickup system which are optimum for the so-called multi-plate type camera which picks up images of high qualities, the three primary colors RGB above all, with a plurality of image pickup devices as described above, it is apparent that the present invention has an object to provide a lens system which has a composition optimum for use with image pickup systems in which optical members such as an optical path splitting prism are disposed on the image side of photographic lens systems for performing automatic focusing and automatic exposure, and image pickup systems in which optical members requiring long optical paths are disposed between photographic lens systems and image surfaces in addition to low pass filters and infrared cut filters such as image pickup systems in which optical members such as optical path splitting prisms and mirrors are disposed on the image side of image pickup lenses for the so-called single-lens type viewfinders.

Since the retrofocus type lens system described above has the negative-positive refractive power distribution which is asymmetrical with regard to a stop, the lens system tends to be hardly capable of correcting offaxial aberrations such as distortion and astigmatism, and since an axial light bundle is converged into a diverging light bundle by the front lens group which has the negative refractive power, the rear lens group tends to have a strong positive refractive power and produce remarkable spherical aberration which can hardly be corrected. As the negative refractive power and the positive refractive power are strengthened, this tendency is more remarkable, and negative distortion produced by the front lens group and negative spherical aberration produced by the rear lens group can hardly be corrected in particular.

In order to favorably correct the aberrations mentioned above, obtain a long back focal length and locate an exit pupil at a nearly infinite distance or an adequately long distance, refractive powers are distributed between the front lens group and the rear lens group so as to satisfy the above-mentioned condition (1).

If $|f_F/f_R|$ has a value which is smaller than the lower limit of 0.3 of the condition (1), the rear lens group R will have an insufficient refractive power, thereby making it difficult to locate an exit pupil at a near infinite distance or an adequately long distance, and an airspace between the front lens group F and the rear lens group R must be widened to obtain a refractive power required for the lens system as a whole, thereby undesirably enlarging the lens system. If $|f_F/f_R|$ has a value which is larger than the upper limit of 1.5 of the condition (1), in contrast, the front lens group F will have an insufficient negative refractive power, thereby making it difficult to maintain the required back focal length.

Since the front lens group F which has the negative refractive power produces aberrations, negative distortion in particular and the rear lens group R which has the positive refractive power also produces negative distortion even when refractive powers are distributed between the front lens group F so as to satisfy the condition (1), negative distortion is remarkable in the lens system as a whole. The negative distortion tends to be more remarkable when the negative and positive refractive powers are strengthened.

In order to correct distortion favorably, it is necessary to produce positive distortion by distributing a positive refractive power in the front lens group F or a negative refractive power in the rear lens group R.

Since an axial ray is refracted by the negative refractive power of the front lens group F in a direction to be apart from the optical axis and is higher on the rear lens group R than on the front lens group F, the positive rear lens group R tends to produce remarkable negative spherical aberration. This tendency is higher when the refractive power of the rear lens group R is strengthened.

An attempt to correct this negative spherical aberration only with the negative refractive power of the front lens group F is not preferable since it allows negative distortion to be produced. It is therefore desirable to correct spherical aberration and distortion by distributing a negative refractive power in the rear lens group R.

In order to correct the remarkable negative distortion produced by the front lens group F and spherical aberration efficiently simply by distributing a negative refractive power in the rear lens group R, it is desirable to configure the rear lens group R so as to have a positive-negative refractive power distribution in order from the object side so as to make axial rays as low as possible on the rear lens group and arrange the negative refractive power on the image side on which offaxial rays are higher. However, it is impossible to maintain a long back focal length with the refractive power distribution described above.

In the lens system according to the present invention, a positive refractive power is distributed in the front lens group F and a negative refractive power is distributed in the rear lens group R so that aberrations are corrected by both the front lens group and the rear lens group. In this case, it is desirable to arrange the positive refractive power on the object side in the front lens group where an offaxial principal ray is high for maintaining the required back focal length, and correcting distortion and astigmatism with a relatively weak refractive power. It is therefore desirable that the front lens group F is composed, in order from the object side, of a first lens unit G1 which consists only of a positive lens component(s) and a second lens unit G2 which consists only of a negative lens component(s).

For making the maintenance of the required back focal length compatible with correction of spherical aberration, on the other hand, it is desirable that the rear lens group R has a positive-negative-positive power distribution in order from the object side so that the axial rays are as low as possible and the rear lens group has a macroscopically negative-positive composition. Speaking more concretely, it is desirable to compose the rear lens group, in order from the object side, of a third lens unit G3 which has a positive power, a fourth lens unit G4 which has a negative power and a fifth lens unit G5 which has a positive power. In addition, it is necessary to configure the fourth lens unit G4 so as to have a power which satisfies the above-mentioned condition (2).

If $|f_R/f_4|$ has a value which is smaller than the lower limit of 0.05 of the condition (2), the fourth lens unit G4 will have a negative power which is insufficient for correction of aberrations. If $|f_R/f_4|$ has a value which is larger than the upper limit of 0.8 of the condition (2), in contrast, the fourth lens unit G4 will have too strong a negative power and overcorrect aberrations.

Further, it is desirable that the fifth lens unit G5 of the rear lens group R satisfies the above-mentioned condition (3).

If $|f_5/f_R|$ has a value which is smaller than the lower limit of 0.8 of the condition (3), the fifth lens unit will have too strong a positive power, whereby the required back focal length can hardly be maintained and negative spherical aberration is too remarkable for correction. If $|f_5/f_R|$ has a value which is larger than the upper limit of 1.5 of the condition (3), it will be difficult to locate an exit pupil at a sufficiently long distance.

The lens system according to the present invention which is configured as described above has a back focal length which permits disposing various kinds of optical members such as not only low pass filters and infrared cut filters but also an optical path splitting member for arrangement of a color separating optical system and a viewfinder, automatic focusing and automatic exposure, and remarkably high optical performance optimum for use with electronic cameras, video cameras and the like which are compact image pickup devices on which large numbers of pixels are arranged.

For the lens system according to the present invention which is configured as described above, it is desirable that the first lens unit G1 and the second lens unit G2 of the front lens group F satisfy the following conditions (4) and (5):

$$0.8<|f_1/f_F|<5.0 \tag{4}$$

$$0.2<|f_2/f_F|<0.9 \tag{5}$$

wherein the reference symbols $f_1$ and $f_2$ represent focal lengths of the first lens unit and the second lens unit respectively of the front lens group, and the reference symbol $f_F$ designates a focal length of the front lens group.

If $|f_1/f_F|$ has a value which is smaller than the lower limit of 0.8 of the condition (4), the first lens unit of the front lens group will have too strong a positive power, whereby the front lens group can hardly have a negative power sufficient for maintaining the required back focal length. If $|f_1/f_F|$ has a value which is larger than the upper limit of 5.0 of the condition (4), the first lens unit will have a weak positive power and an insufficient distortion correcting function, thereby allowing negative distortion to remain in the front lens group.

If the lower limit of 0.2 of the condition (5) is exceeded, the second lens unit of the front lens group will have too strong a negative power, whereby distortion can hardly be corrected with the first lens unit which has the positive power. If the upper limit of 0.9 of the condition (5) is exceeded, in contrast, the second lens unit will have a weak negative power, whereby the front lens group cannot have a negative power which is sufficient to maintain the required back focal length.

For correcting aberrations more favorably, it is desirable that the fourth lens unit which has the negative power in the rear lens group is configured as a cemented lens component consisting of a negative lens element and a positive lens element or, more preferably, a biconcave lens element and a biconvex lens element.

Further, it is desirable that the second lens unit of the front lens group is composed, in order from the object side, of at least two negative lens components, or a negative meniscus lens component having a convex surface on the object side and a biconcave lens component so that it has a function to cancel astigmatism produced by the first lens unit of the front lens group.

Since the lens system according to the present invention is configured so as to have an exit pupil at a nearly infinite distance of an adequately long distance as described above, it is desirable to dispose a positive lens component on the image side in the rear lens group.

Speaking more concretely, it is desirable to dispose a positive lens component Lp on the image side in the lens system according to the present invention which is configured as described above and satisfies the conditions (1) through (3) and/or the conditions (4) and (5). It is more desirable that the positive lens component Lp satisfies the following condition (6):

$$-1.3<SF_P<-0.5 \tag{6}$$

wherein the reference symbol $SF_P$ represents a shaping factor of the positive lens component.

When radii of curvature on an object side surface and an image side surface of a lens component are represented by $r_a$ and $r_b$ respectively, a shaping factor SF of the lens component is determined by the following formula:

$$SF=(r_a+r_b)/(r_a-r_b)$$

If $SF_P$ has a value which is smaller than the lower limit of −1.3 of the condition (6), an image side surface of the lens component will have a strong positive power, whereby spherical aberration and coma will undesirably be produced in large amounts. If $SF_P$ has a value which is larger than the upper limit of −0.5 of the condition (6), in contrast, the lens component can hardly have a required positive power, thereby making it difficult to locate an exit pupil at a desired position.

The lens system according to the present invention can be focused onto objects located within a range from infinite distance to an extremely short distance while maintaining favorable optical performance by moving it so as to widen an airspace reserved between the positive lens component (the positive lens component disposed on the image side in the rear lens group) Lp and a lens unit or a lens component which is disposed on the object side of the positive lens component Lp.

When the lens system is to be focused by the method described above, it is desirable to suppress variations of aberrations that the positive lens component satisfies the following condition (7):

$$0.1<|f_R/f_P|<0.55 \tag{7}$$

wherein the reference symbol $f_P$ represents a focal length of the positive lens component Lp disposed on the image side of the lens system and the reference symbol $f_R$ designates a focal length of the rear lens group.

If $|f_R/f_P|$ has a value which is smaller than the lower limit of 0.1 of the condition (7), a positive power required for imaging is concentrated on the positive lens component, whereby the lens component produces aberrations in amounts too large for correction and a lens unit or lens units must be moved for a long distance for focusing. If $|f_R/f_P|$ has a value which is larger than the upper limit of 0.55 of the condition (7), in contrast, the positive lens component will have a weak power and the lens unit or lens units which are to be moved for focusing will have too strong a power, thereby causing remarkable variations of aberrations due to focusing.

When the lens system is focused by moving lens units and lens components which are disposed on the object side of the positive lens component Lp while keeping this lens component stationary, it is possible to obtain stable and favorable optical performance for objects located within the range from infinite distance to a short distance with a relatively simple focusing mechanism.

In order to correct aberrations more favorably in the lens system according to the present invention, it is desirable that the third lens unit which has the positive power in the rear lens group is composed, in order from the object side, of a lens component which comprises at least a positive lens element, and a cemented lens component which consists of a positive meniscus lens element having a concave surface on the object side and a negative meniscus lens element having a concave surface on the object side.

When the third lens unit of the rear lens group is composed as described above, the axial rays are not higher than required and it is possible to suppress negative spherical aberration while reserving a sufficient positive power, thereby enabling to correct spherical aberration without strengthening the negative power of the fourth lens unit.

In order to correct aberrations more favorably in the lens system according to the present invention, it is desirable to satisfy, in place of the conditions (1) through (7), the following conditions (1-1) through (7-1):

$$0.38 < |f_F / f_R| < 1.4 \quad (1\text{-}1)$$

$$0.08 < |f_R / f_4| < 0.7 \quad (2\text{-}1)$$

$$0.8 < |f_5 / f_R| < 1.2 \quad (3\text{-}1)$$

$$0.85 < |f_1 / f_F| < 4.5 \quad (4\text{-}1)$$

$$0.25 < |f_2 / f_F| < 0.8 \quad (5\text{-}1)$$

$$-1.2 < SF_P < -0.6 \quad (6\text{-}1)$$

$$0.2 < |f_R / f_P| < 0.5 \quad (7\text{-}1)$$

The effects to correct aberrations can be made more remarkable by replacing any one or an adequate combination of two or more of the conditions (1), (2), (3), (4), (5), (6) and (7) with a corresponding one or combination of the conditions listed above, and it is more desirable to replace all the conditions (1) through (7) with those listed above.

In order to correct aberrations much more favorably, it is desirable to replace at least one or a combination of a plurality of the conditions (2-1) through (7-1) with a corresponding one or combination of the following conditions (2-2) through (7-2):

$$0.09 < |f_R / f_4| < 0.65 \quad (2\text{-}2)$$

$$0.85 < |f_5 / f_R| < 1.05 \quad (3\text{-}2)$$

$$0.9 < |f_1 / f_F| < 3.0 \quad (4\text{-}2)$$

$$0.3 < |f_2 / f_F| < 0.75 \quad (5\text{-}2)$$

$$-1.1 < SF_P < -0.7 \quad (6\text{-}2)$$

$$0.25 < |f_R / f_P| < 0.45 \quad (7\text{-}2)$$

In order to configure the lens system according to the present invention so as to have a wide field angle and an exit pupil at a nearly infinite distance or an adequately long distance, it is desirable to satisfy the following condition (8):

$$|f/EX| < 0.1 \quad (8)$$

wherein the reference symbol EX represents a length to a paraxial exit pupil (a length from an image surface in the lens system to an image surface) and the reference symbol f designates a focal length of the lens system as a whole.

If $|f/EX|$ has a value which is larger than the upper limit of 0.1 of the condition (8), rays incident on a dichroic film have angles of incidence which are different between a center and a marginal portion of a screen when a color separating prism, for example, is disposed between the lens system and an image pickup device and spectral characteristics of split rays are different between the center and the marginal portion of the screen, thereby making the so-called color shading more remarkable. Even when the color shading is corrected with an electric circuit, amounts to be corrected with a stop will undesirably be large.

Even when a color separating prism is not disposed, rays which have inclinations are incident on the image pickup device, thereby producing ununiformity in brightness and spurious signals or degrading universality as already described above.

Further, it is more desirable to satisfy, in place of the condition (8), the following condition (8-1):

$$|f/EX| < 0.05 \quad (8\text{-}1)$$

Now, embodiments of the lens system according to the present invention will be described in a form of numerical data listed below:

| Embodiment 1 | | | |
|---|---|---|---|
| f = 45.003, F/2.81, 2ω = 28.20° | | | |
| $r_1 =$ 45.6910 | | | |
| | $d_1 = 6.300$ | $n_1 = 1.71615$ | $ν_1 = 53.84$ |
| $r_2 =$ −227.3380 | | | |
| | $d_2 = 0.450$ | | |
| $r_3 =$ 19.4610 | | | |
| | $d_3 = 3.950$ | $n_2 = 1.48915$ | $ν_2 = 70.20$ |
| $r_4 =$ 14.4540 | | | |
| | $d_4 = 5.280$ | | |
| $r_5 =$ −41.9980 | | | |
| | $d_5 = 2.600$ | $n_3 = 1.67158$ | $ν_3 = 33.04$ |
| $r_6 =$ 23.2870 | | | |
| | $d_6 = 5.260$ | | |
| $r_7 =$ −105.0010 | | | |
| | $d_7 = 6.830$ | $n_4 = 1.48915$ | $ν_4 = 70.20$ |
| $r_8 =$ 30.9980 | | | |
| | $d_6 = 3.800$ | $n_5 = 1.85504$ | $ν_5 = 23.78$ |
| $r_9 =$ 278.8880 | | | |
| | $d_9 = 3.540$ | | |
| $r_{10} =$ ∞ (stop) | | | |
| | $d_{10} = 5.050$ | | |
| $r_{11} =$ −170.6070 | | | |
| | $d_{11} = 5.750$ | $n_6 = 1.48915$ | $ν_6 = 70.20$ |
| $r_{12} =$ −20.3910 | | | |
| | $d_{12} = 2.450$ | $n_7 = 1.63004$ | $ν_7 = 35.70$ |
| $r_{13} =$ −32.7890 | | | |
| | $d_{13} = 8.416$ | | |
| $r_{14} =$ −48.1330 | | | |
| | $d_{14} = 2.700$ | $n_8 = 1.80642$ | $ν_8 = 34.97$ |
| $r_{15} =$ 45.1140 | | | |
| | $d_{15} = 6.690$ | $n_9 = 1.48915$ | $ν_9 = 70.20$ |
| $r_{16} =$ −39.2760 | | | |
| | $d_{16} = 7.688$ | | |
| $r_{17} =$ 124.0200 | | | |
| | $d_{17} = 7.670$ | $n_{10} = 1.49845$ | $ν_{10} = 81.61$ |
| $r_{18} =$ −41.3130 | | | |
| | $d_{18} = D_1$ (variable) | | |
| $r_{19} =$ 59.5930 | | | |
| | $d_{19} = 6.420$ | $n_{11} = 1.48915$ | $ν_{11} = 70.20$ |
| $r_{20} =$ −1030.1600 | | | |
| | $d_{20} = 2.000$ | | |
| $r_{21} =$ ∞ | | | |
| | $d_{21} = 18.500$ | $n_{12} = 1.51825$ | $ν_{12} = 64.15$ |
| $r_{22} =$ ∞ | | | |
| | $d_{22} = 1.000$ | | |
| $r_{23} =$ ∞ | | | |
| | $d_{23} = 50.500$ | $n_{13} = 1.69979$ | $ν_{13} = 55.52$ |

-continued

Embodiment 1

$r_{24} = \infty$
object distance  $\infty$   $-4493.694$   $-1314.947$
$D_1$  15.285  16.729  20.204
$|f_F/f_R| = 1.148$, $|f_R/f_4| = 0.450$, $|f_5/f_R| = 0.987$
$|f_1/f_F| = 1.024$, $|f_2/f_F| = 0.376$, $SF_P = -0.891$
$|f_R/f_P| = 0.395$, $|f/EX| = 0.025$

Embodiment 2

$f = 45.060$, $F/2.80$, $2\omega = 30.70°$
$r_1 = 64.2609$
  $d_1 = 4.764$  $n_1 = 1.71615$  $\nu_1 = 53.84$
$r_2 = -125.1618$
  $d_2 = 0.150$
$r_3 = 19.8663$
  $d_3 = 2.502$  $n_2 = 1.48915$  $\nu_2 = 70.20$
$r_4 = 13.5083$
  $d_4 = 5.441$
$r_5 = -29.2844$
  $d_5 = 2.000$  $n_3 = 1.67158$  $\nu_3 = 33.04$
$r_6 = 37.5423$
  $d_6 = 1.915$
$r_7 = -149.5157$
  $d_7 = 4.818$  $n_4 = 1.48915$  $\nu_4 = 70.20$
$r_8 = 38.7128$
  $d_8 = 0.150$
$r_9 = 30.5680$
  $d_9 = 3.500$  $n_5 = 1.85504$  $\nu_5 = 23.78$
$r_{10} = -84.1974$
  $d_{10} = 1.694$
$r_{11} = \infty$ (stop)
  $d_{11} = 3.791$
$r_{12} = -35.5927$
  $d_{12} = -7.268$  $n_6 = 1.48915$  $\nu_6 = 70.20$
$r_{13} = -14.0205$
  $d_{13} = 2.000$  $n_7 = 1.63004$  $\nu_7 = 35.70$
$r_{14} = -25.8790$
  $d_{14} = 12.502$
$r_{15} = -39.1822$
  $d_{15} = 3.650$  $n_8 = 1.80642$  $\nu_8 = 34.97$
$r_{16} = 65.3397$
  $d_{16} = 7.151$  $n_9 = 1.48915$  $\nu_9 = 70.20$
$r_{17} = -29.9939$
  $d_{17} = 8.891$
$r_{18} = 94.2482$
  $d_{18} = 11.336$  $n_{10} = 1.48915$  $\nu_{10} = 70.20$
$r_{19} = -26.0615$
  $d_{19} = 2.350$  $n_{11} = 1.54212$  $\nu_{11} = 59.57$
$r_{20} = -50.0229$
  $d_{20} = 2.000$
$r_{21} = 81.4808$
  $d_{21} = 4.179$  $n_{12} = 1.48915$  $\nu_{12} = 70.20$
$r_{22} = -659.6414$
  $d_{22} = 1.800$
$r_{23} = \infty$
  $d_{23} = 2.000$  $n_{13} = 1.51825$  $\nu_{13} = 64.15$
$r_{24} = \infty$
  $d_{24} = 2.000$
$r_{25} = \infty$
  $d_{25} = 1.8000$  $n_{14} = 1.51825$  $\nu_{14} = 64.15$
$r_{26} = \infty$
  $d_{26} = 4.000$
$r_{27} = \infty$
  $d_{27} = 55.000$  $n_{15} = 1.58566$  $\nu_{15} = 46.33$
$r_{28} = \infty$
  $d_{28} = 1.000$
$r_{29} = \infty$
  $d_{29} = 10.000$  $n_{16} = 1.51825$  $\nu_{16} = 64.15$
$r_{30} = \infty$
$|f_F/f_R| = 0.742$, $|f_R/f_4| = 0.329$, $|f_5/f_R| = 1.109$
$|f_1/f_F| = 1.631$, $|f_2/f_F| = 0.522$, $SF_P = -0.780$
$|f_R/f_P| = 0.334$, $|f/EX| = 0.009$

Embodiment 3

$f = 44.957$, $F/2.80$, $2\omega = 30.77°$
$r_1 = 72.6162$
  $d_1 = 4.586$  $n_1 = 1.71615$  $\nu_1 = 53.84$
$r_2 = -138.6868$
  $d_2 = 0.150$
$r_3 = 20.0956$
  $d_3 = 3.331$  $n_2 = 1.48915$  $\nu_2 = 70.20$
$r_4 = 13.9215$
  $d_4 = 5.614$
$r_5 = -31.0884$
  $d_5 = 2.000$  $n_3 = 1.67158$  $\nu_3 = 33.04$
$r_6 = 34.9125$
  $d_6 = 1.948$
$r_7 = -129.1819$
  $d_7 = 6.858$  $n_4 = 1.48915$  $\nu_4 = 70.20$
$r_8 = 44.4328$
  $d_8 = 0.150$
$r_9 = 35.8694$
  $d_9 = 3.500$  $n_5 = 1.85504$  $\nu_5 = 23.78$
$r_{10} = -73.6689$
  $d_{10} = 1.615$
$r_{11} = \infty$ (stop)
  $d_{11} = 3.536$
$r_{12} = -48.1616$
  $d_{12} = 5.000$  $n_6 = 1.48915$  $\nu_6 = 70.20$
$r_{13} = -15.3531$
  $d_{13} = 4.200$  $n_7 = 1.63004$  $\nu_7 = 35.70$
$r_{14} = -27.5447$
  $d_{14} = 15.364$
$r_{15} = -41.7757$
  $d_{15} = 1.881$  $n_8 = 1.80642$  $\nu_8 = 34.97$
$r_{16} = 43.6274$
  $d_{16} = 7.121$  $n_9 = 1.48915$  $\nu_9 = 70.20$
$r_{17} = -34.3345$
  $d_{17} = 10.621$
$r_{18} = 122.8957$
  $d_{18} = 8.326$  $n_{10} = 1.49845$  $\nu_{10} = 81.61$
$r_{19} = -43.7022$
  $d_{19} = 2.350$
$r_{20} = 86.4061$
  $d_{20} = 4.000$  $n_{11} = 1.48915$  $\nu_{11} = 70.20$
$r_{21} = -515.6981$
  $d_{21} = 1.701$
$r_{22} = \infty$
  $d_{22} = 2.000$  $n_{12} = 1.51825$  $\nu_{12} = 64.15$
$r_{23} = \infty$
  $d_{23} = 2.000$
$r_{24} = \infty$
  $d_{24} = 18.000$  $n_{13} = 1.51825$  $\nu_{13} = 64.15$
$r_{25} = \infty$
  $d_{25} = 4.000$
$r_{26} = \infty$
  $d_{26} = 55.000$  $n_{14} = 1.58566$  $\nu_{14} = 46.33$
$r_{27} = \infty$
  $d_{27} = 1.000$
$r_{28} = \infty$
  $d_{28} = 10.000$  $n_{15} = 1.51825$  $\nu_{15} = 64.15$
$r_{29} = \infty$
$|f_F/f_R| = 0.727$, $|f_R/f_4| = 0.523$, $|f_5/f_R| = 0.928$
$|f_1/f_F| = 1.831$, $|f_2/f_F| = 0.543$, $SF_P = -0.713$
$|f_R/f_P| = 0.333$, $|f/EX| = 0.007$

Embodiment 4

$f = 45.100$, $F/2.80$, $2\omega = 30.67°$
$r_1 = 57.4322$
  $d_1 = 4.970$  $n_1 = 1.71615$  $\nu_1 = 53.84$
$r_2 = -208.7110$
  $d_2 = 0.651$
$r_3 = 22.1251$
  $d_3 = 3.355$  $n_2 = 1.48915$  $\nu_2 = 70.20$
$r_4 = 14.6316$
  $d_4 = 6.348$
$r_5 = -33.8819$
  $d_5 = 2.000$  $n_3 = 1.67158$  $\nu_3 = 33.04$ -continued

| Embodiment 4 | | | |
|---|---|---|---|
| $r_6 =$ | 37.0659 | | |
| | $d_6 = 1.962$ | | |
| $r_7 =$ | −260.6315 | | |
| | $d_7 = 6.548$ | $n_4 = 1.48915$ | $\nu_4 = 70.20$ |
| $r_8 =$ | 26.8439 | | |
| | $d_8 = 3.500$ | $n_5 = 1.85504$ | $\nu_5 = 23.78$ |
| $r_9 =$ | −244.0879 | | |
| | $d_9 = 2.010$ | | |
| $r_{10} =$ | ∞ (stop) | | |
| | $d_{10} = 3.443$ | | |
| $r_{11} =$ | −48.2322 | | |
| | $d_{11} = 5.000$ | $n_6 = 1.48915$ | $\nu_6 = 70.20$ |
| $r_{12} =$ | −15.8482 | | |
| | $d_{12} = 2.294$ | $n_7 = 1.63004$ | $\nu_7 = 35.70$ |
| $r_{13} =$ | −29.9018 | | |
| | $d_{13} = 15.654$ | | |
| $r_{14} =$ | −76.5997 | | |
| | $d_{14} = 3.650$ | $n_8 = 1.80642$ | $\nu_8 = 34.97$ |
| $r_{15} =$ | 42.2078 | | |
| | $d_{15} = 6.907$ | $n_9 = 1.48915$ | $\nu_9 = 70.20$ |
| $r_{16} =$ | −43.2021 | | |
| | $d_{16} = 8.936$ | | |
| $r_{17} =$ | 108.0750 | | |
| | $d_{17} = 8.821$ | $n_{10} = 1.49845$ | $\nu_{10} = 81.61$ |
| $r_{18} =$ | −43.6766 | | |
| | $d_{18} = 2.000$ | | |
| $r_{19} =$ | 76.2644 | | |
| | $d_{19} = 4.000$ | $n_{11} = 1.48915$ | $\nu_{11} = 70.20$ |
| $r_{20} =$ | 1917.4776 | | |
| | $d_{20} = 1.701$ | | |
| $r_{21} =$ | ∞ | | |
| | $d_{21} = 2.000$ | $n_{12} = 1.51825$ | $\nu_{12} = 64.15$ |
| $r_{22} =$ | ∞ | | |
| | $d_{22} = 2.000$ | | |
| $r_{23} =$ | ∞ | | |
| | $d_{23} = 18.000$ | $n_{13} = 1.51825$ | $\nu_{13} = 64.15$ |
| $r_{24} =$ | ∞ | | |
| | $d_{24} = 4.000$ | | |
| $r_{25} =$ | ∞ | | |
| | $d_{25} = 55.000$ | $n_{14} = 1.58566$ | $\nu_{14} = 46.33$ |
| $r_{26} =$ | ∞ | | |
| | $d_{26} = 1.000$ | | |
| $r_{27} =$ | ∞ | | |
| | $d_{27} = 10.000$ | $n_{15} = 1.51825$ | $\nu_{15} = 64.15$ |
| $r_{28} =$ | ∞ | | |
| $\|f_F/f_R\| = 0.885$, $\|f_R/f_4\| = 0.272$, $\|f_5/f_R\| = 0.969$ | | | |
| $\|f_1/f_F\| = 1.495$, $\|f_2/f_F\| = 0.485$, $SF_P = -1.083$ | | | |
| $\|f_R/f_P\| = 0.295$, $\|f/EX\| = 0.011$ | | | |

| Embodiment 5 | | | |
|---|---|---|---|
| $f = 45.100$, F/2.80, $2\omega = 30.67°$ | | | |
| $r_1 =$ | 50.9877 | | |
| | $d_1 = 5.173$ | $n_1 = 1.71615$ | $\nu_1 = 53.84$ |
| $r_2 =$ | −205.7361 | | |
| | $d_2 = 0.150$ | | |
| $r_3 =$ | 20.3772 | | |
| | $d_3 = 2.383$ | $n_2 = 1.48915$ | $\nu_2 = 70.20$ |
| $r_4 =$ | 14.0173 | | |
| | $d_4 = 6.356$ | | |
| $r_5 =$ | −33.6415 | | |
| | $d_5 = 2.000$ | $n_3 = 1.67158$ | $\nu_3 = 33.04$ |
| $r_6 =$ | 33.6153 | | |
| | $d_6 = 2.043$ | | |
| $r_7 =$ | −157.4995 | | |
| | $d_7 = 5.285$ | $n_4 = 1.48915$ | $\nu_4 = 70.20$ |
| $r_8 =$ | 22.5607 | | |
| | $d_8 = 3.500$ | $n_5 = 1.85504$ | $\nu_5 = 23.78$ |
| $r_9 =$ | −1646.0575 | | |
| | $d_9 = 2.128$ | | |
| $r_{10} =$ | ∞ (stop) | | |
| | $d_{10} = 3.293$ | | |
| $r_{11} =$ | −201.9275 | | |
| | $d_{11} = 7.545$ | $n_6 = 1.48915$ | $\nu_6 = 70.20$ |
| $r_{12} =$ | −15.4999 | | |

-continued

| Embodiment 5 | | | |
|---|---|---|---|
| | $d_{12} = 3.599$ | $n_7 = 1.63004$ | $\nu_7 = 35.70$ |
| $r_{13} =$ | −35.4231 | | |
| | $d_{13} = 12.161$ | | |
| $r_{14} =$ | −40.3079 | | |
| | $d_{14} = 2.699$ | $n_8 = 1.80642$ | $\nu_8 = 34.97$ |
| $r_{15} =$ | 72.6733 | | |
| | $d_{15} = 6.959$ | $n_9 = 1.48915$ | $\nu_9 = 70.20$ |
| $r_{16} =$ | −29.2135 | | |
| | $d_{16} = 9.567$ | | |
| $r_{17} =$ | 116.5068 | | |
| | $d_{17} = 9.854$ | $n_{10} = 1.48915$ | $\nu_{10} = 70.20$ |
| $r_{18} =$ | −29.9762 | | |
| | $d_{18} = -2.000$ | $n_{11} = 1.54212$ | $\nu_{11} = 59.57$ |
| $r_{19} =$ | −50.0229 | | |
| | $d_{19} = 1.350$ | | |
| $r_{20} =$ | 74.0591 | | |
| | $d_{20} = 4.000$ | $n_{12} = 1.48915$ | $\nu_{12} = 70.20$ |
| $r_{21} =$ | −658.6796 | | |
| | $d_{21} = 1.800$ | | |
| $r_{22} =$ | ∞ | | |
| | $d_{22} = 2.000$ | $n_{13} = 1.51825$ | $\nu_{13} = 64.15$ |
| $r_{23} =$ | ∞ | | |
| | $d_{23} = 2.000$ | | |
| $r_{24} =$ | ∞ | | |
| | $d_{24} = 18.000$ | $n_{14} = 1.51825$ | $\nu_{14} = 64.15$ |
| $r_{25} =$ | ∞ | | |
| | $d_{25} = 4.000$ | | |
| $r_{26} =$ | ∞ | | |
| | $d_{26} = 55.000$ | $n_{15} = 1.58566$ | $\nu_{15} = 46.33$ |
| $r_{27} =$ | ∞ | | |
| | $d_{27} = 1.000$ | | |
| $r_{28} =$ | ∞ | | |
| | $d_{28} = 10.000$ | $n_{16} = 1.51825$ | $\nu_{16} = 64.15$ |
| $r_{29} =$ | ∞ | | |
| $\|f_F/f_R\| = 0.862$, $\|f_R/f_4\| = 0.256$, $\|f_5/f_R\| = 1.045$ | | | |
| $\|f_1/f_F\| = 1.391$, $\|f_2/f_F\| = 0.473$, $SF_P = -0.798$ | | | |
| $\|f_R/f_P\| = 0.352$, $\|f/EX\| = 0.009$ | | | |

| Embodiment 6 | | | |
|---|---|---|---|
| $f = 44.950$, F/2.80, $2\omega = 30.76°$ | | | |
| $r_1 =$ | −1375.2494 | | |
| | $d_1 = 3.926$ | $n_1 = 1.73234$ | $\nu_1 = 54.68$ |
| $r_2 =$ | −64.8810 | | |
| | $d_2 = 0.150$ | | |
| $r_3 =$ | 24.1112 | | |
| | $d_3 = 4.500$ | $n_2 = 1.48915$ | $\nu_2 = 70.20$ |
| $r_4 =$ | 15.7678 | | |
| | $d_4 = 4.796$ | | |
| $r_5 =$ | −25.4624 | | |
| | $d_5 = 3.871$ | $n_3 = 1.67158$ | $\nu_3 = 33.04$ |
| $r_6 =$ | 33.7979 | | |
| | $d_6 = 3.712$ | | |
| $r_7 =$ | 40.2420 | | |
| | $d_7 = 3.500$ | $n_4 = 1.85504$ | $\nu_4 = 23.78$ |
| $r_8 =$ | −48.6363 | | |
| | $d_8 = 1.256$ | | |
| $r_9 =$ | ∞ (stop) | | |
| | $d_9 = 4.141$ | | |
| $r_{10} =$ | −28.8331 | | |
| | $d_{10} = 7.567$ | $n_5 = 1.48915$ | $\nu_5 = 70.20$ |
| $r_{11} =$ | −14.4272 | | |
| | $d_{11} = 4.140$ | $n_6 = 1.63004$ | $\nu_6 = 35.70$ |
| $r_{12} =$ | −23.0141 | | |
| | $d_{12} = 9.019$ | | |
| $r_{13} =$ | −29.3072 | | |
| | $d_{13} = 3.650$ | $n_7 = 1.80642$ | $\nu_7 = 34.97$ |
| $r_{14} =$ | 65.4608 | | |
| | $d_{14} = 8.666$ | $n_8 = 1.48915$ | $\nu_8 = 70.20$ |
| $r_{15} =$ | −28.5943 | | |
| | $d_{15} = 11.509$ | | |
| $r_{16} =$ | 144.8802 | | |
| | $d_{16} = 10.147$ | $n_9 = 1.48915$ | $\nu_9 = 70.20$ |
| $r_{17} =$ | −29.0630 | | |
| | $d_{17} = 2.00$ | $n_{10} = 1.58566$ | $\nu_{10} = 46.33$ |

-continued

| Embodiment 6 | | | |
|---|---|---|---|
| $r_{18}$ = | −49.0875 | | |
| | $d_{18}$ = −1.500 | | |
| $r_{19}$ = | 70.6074 | | |
| | $d_{19}$ = 4.000 | $n_{11}$ = 1.48915 | $\nu_{11}$ = 70.20 |
| $r_{20}$ = | −880.8777 | | |
| | $d_{20}$ = 1.800 | | |
| $r_{21}$ = | ∞ | | |
| | $d_{21}$ = 2.000 | $n_{12}$ = 1.51825 | $\nu_{12}$ = 64.15 |
| $r_{22}$ = | ∞ | | |
| | $d_{22}$ = 2.000 | | |
| $r_{23}$ = | ∞ | | |
| | $d_{23}$ = 18.000 | $n_{13}$ = 1.51825 | $\nu_{13}$ = 64.15 |
| $r_{24}$ = | ∞ | | |
| | $d_{24}$ = 4.000 | | |
| $r_{25}$ = | ∞ | | |
| | $d_{25}$ = 55.000 | $n_{14}$ = 1.58566 | $\nu_{14}$ = 46.33 |
| $r_{26}$ = | ∞ | | |
| | $d_{26}$ = 1.000 | | |
| $r_{27}$ = | ∞ | | |
| | $d_{27}$ = 10.000 | $n_{15}$ = 1.51825 | $\nu_{15}$ = 64.15 |
| $r_{28}$ = | ∞ | | |
| $|f_F/f_R|$ = 0.472, $|f_R/f_4|$ = 0.612, $|f_5/f_R|$ = 0.977 | | | |
| $|f_1/f_F|$ = 3.643, $|f_2/f_F|$ = 0.703, $SF_P$ = −0.852 | | | |
| $|f_R/f_P|$ = 0.404, $|f/EX|$ = 0.006 | | | |

| Embodiment 7 | | | |
|---|---|---|---|
| f = 44.962, F/2.80, 2ω = 30.76° | | | |
| $r_1$ = | −516.0167 | | |
| | $d_1$ = 3.826 | $n_1$ = 1.77620 | $\nu_1$ = 49.66 |
| $r_2$ = | −64.5429 | | |
| | $d_2$ = 0.150 | | |
| $r_3$ = | 24.4437 | | |
| | $d_3$ = 4.500 | $n_2$ = 1.48915 | $\nu_2$ = 70.20 |
| $r_4$ = | 15.7543 | | |
| | $d_4$ = 5.072 | | |
| $r_5$ = | −24.2995 | | |
| | $d_5$ = 6.466 | $n_3$ = 1.69417 | $\nu_3$ = 31.08 |
| $r_6$ = | 33.8817 | | |
| | $d_6$ = 2.236 | | |
| $r_7$ = | 41.2966 | | |
| | $d_7$ = 4.500 | $n_4$ = 1.85504 | $\nu_4$ = 23.78 |
| $r_8$ = | −42.8563 | | |
| | $d_8$ = 1.104 | | |
| $r_9$ = | ∞ (stop) | | |
| | $d_9$ = 4.570 | | |
| $r_{10}$ = | −25.4911 | | |
| | $d_{10}$ = 5.000 | $n_5$ = 1.48915 | $\nu_5$ = 70.20 |
| $r_{11}$ = | −13.9304 | | |
| | $d_{11}$ = 4.200 | $n_6$ = 1.64419 | $\nu_6$ = 34.48 |
| $r_{12}$ = | −21.6077 | | |
| | $d_{12}$ = 15.673 | | |
| $r_{13}$ = | −36.9119 | | |
| | $d_{13}$ = 3.650 | $n_7$ = 1.80642 | $\nu_7$ = 34.97 |
| $r_{14}$ = | 50.6337 | | |
| | $d_{14}$ = 8.314 | $n_8$ = 1.48915 | $\nu_8$ = 70.20 |
| $r_{15}$ = | −35.2407 | | |
| | $d_{15}$ = 8.788 | | |
| $r_{16}$ = | 140.4621 | | |
| | $d_{16}$ = 8.000 | $n_9$ = 1.49845 | $\nu_9$ = 81.61 |
| $r_{17}$ = | −46.4675 | | |
| | $d_{17}$ = 1.500 | | |
| $r_{18}$ = | 71.7081 | | |
| | $d_{18}$ = 4.500 | $n_{10}$ = 1.48915 | $\nu_{10}$ = 70.20 |
| $r_{19}$ = | −5047.8462 | | |
| | $d_{19}$ = 1.800 | | |
| $r_{20}$ = | ∞ | | |
| | $d_{20}$ = 2.000 | $n_{11}$ = 1.51825 | $\nu_{11}$ = 64.15 |
| $r_{21}$ = | ∞ | | |
| | $d_{21}$ = 2.000 | | |
| $r_{22}$ = | ∞ | | |
| | $d_{22}$ = 18.000 | $n_{12}$ = 1.51825 | $\nu_{12}$ = 64.15 |

-continued

| Embodiment 7 | | | |
|---|---|---|---|
| $r_{23}$ = | ∞ | | |
| | $d_{23}$ = 4.000 | | |
| $r_{24}$ = | ∞ | | |
| | $d_{24}$ = 55.000 | $n_{13}$ = 1.58566 | $\nu_{13}$ = 46.33 |
| $r_{25}$ = | ∞ | | |
| | $d_{25}$ = 1.000 | | |
| $r_{26}$ = | ∞ | | |
| | $d_{26}$ = 10.000 | $n_{14}$ = 1.51825 | $\nu_{14}$ = 64.15 |
| $r_{27}$ = | ∞ | | |
| $|f_F/f_R|$ = 0.416, $|f_R/f_4|$ = 0.648, $|f_5/f_R|$ = 0.872 | | | |
| $|f_1/f_F|$ = 4.114, $|f_2/f_F|$ = 0.719, $SF_P$ = −0.972 | | | |
| $|f_R/f_P|$ = 0.383, $|f/EX|$ = 0.006 | | | |

| Embodiment 8 | | | |
|---|---|---|---|
| f = 45.003, F/2.83, 2ω = 28.11° | | | |
| $r_1$ = | 55.2609 | | |
| | $d_1$ = 6.668 | $n_1$ = 1.71615 | $\nu_1$ = 53.84 |
| $r_2$ = | −270.1164 | | |
| | $d_2$ = 0.450 | | |
| $r_3$ = | 24.4830 | | |
| | $d_3$ = 4.203 | $n_2$ = 1.48915 | $\nu_2$ = 70.20 |
| $r_4$ = | 16.9214 | | |
| | $d_4$ = 8.710 | | |
| $r_5$ = | −36.8548 | | |
| | $d_5$ = 2.600 | $n_3$ = 1.67158 | $\nu_3$ = 33.04 |
| $r_6$ = | 30.3056 | | |
| | $d_6$ = 2.727 | | |
| $r_7$ = | −146.8179 | | |
| | $d_7$ = 6.000 | $n_4$ = 1.48915 | $\nu_4$ = 70.20 |
| $r_8$ = | 30.1775 | | |
| | $d_8$ = 3.800 | $n_5$ = 1.85504 | $\nu_5$ = 23.78 |
| $r_9$ = | ∞ | | |
| | $d_9$ = 4.959 | | |
| $r_{10}$ = | ∞ (stop) | | |
| | $d_{10}$ = 8.319 | | |
| $r_{11}$ = | −153.2146 | | |
| | $d_{11}$ = 8.000 | $n_6$ = 1.48915 | $\nu_6$ = 70.20 |
| $r_{12}$ = | −19.4714 | | |
| | $d_{12}$ = 2.450 | $n_7$ = 1.63004 | $\nu_7$ = 35.70 |
| $r_{13}$ = | −39.1233 | | |
| | $d_{13}$ = 10.939 | | |
| $r_{14}$ = | −107.1179 | | |
| | $d_{14}$ = 2.700 | $n_8$ = 1.80922 | $\nu_8$ = 39.58 |
| $r_{15}$ = | 52.5152 | | |
| | $d_{15}$ = 5.799 | $n_9$ = 1.48915 | $\nu_9$ = 70.20 |
| $r_{16}$ = | −52.5152 | | |
| | $d_{16}$ = 5.310 | | |
| $r_{17}$ = | 104.4296 | | |
| | $d_{17}$ = 8.033 | $n_{10}$ = 1.49845 | $\nu_{10}$ = 81.61 |
| $r_{18}$ = | −46.7552 | | |
| | $d_{18}$ = $D_1$ (variable) | | |
| $r_{19}$ = | 70.4321 | | |
| | $d_{19}$ = 4.499 | $n_{11}$ = 1.48915 | $\nu_{11}$ = 70.20 |
| $r_{20}$ = | ∞ | | |
| | $d_{20}$ = 8.000 | | |
| $r_{21}$ = | ∞ | | |
| | $d_{21}$ = 19.000 | $n_{12}$ = 1.51825 | $\nu_{12}$ = 64.15 |
| $r_{22}$ = | ∞ | | |
| | $d_{22}$ = 6.380 | | |
| $r_{23}$ = | ∞ | | |
| | $d_{23}$ = 50.000 | $n_{13}$ = 1.71615 | $\nu_{13}$ = 53.84 |
| $r_{24}$ = | ∞ | | |

| object distance | ∞ | −4493.694 | −1345.000 | −440.000 | −220.000 |
|---|---|---|---|---|---|
| D1 | 9.847 | 11.171 | 14.235 | 22.939 | 35.128 |

$|f_F/f_R|$ = 1.026, $|f_R/f_4|$ = 0.177, $|f_5/f_R|$ = 1.029
$|f_1/f_F|$ = 1.355, $|f_2/f_F|$ = 0.429, $SF_P$ = −1.000
$|f_R/f_P|$ = 0.323, $|f/EX|$ = 0.025

Embodiment 9 f = 45.042, F/2.83, 2ω = 28.13°

| | | | |
|---|---|---|---|
| $r_1 =$ 33.8021 | | | |
| | $d_1 = 10.050$ | $n_1 = 1.71615$ | $v_1 = 53.84$ |
| $r_2 =$ 238.6280 | | | |
| | $d_2 = 0.150$ | | |
| $r_3 =$ 24.4769 | | | |
| | $d_3 = 4.265$ | $n_2 = 1.48915$ | $v_2 = 70.20$ |
| $r_4 =$ 17.4158 | | | |
| | $d_4 = 6.739$ | | |
| $r_5 =$ −131.6000 | | | |
| | $d_5 = 3.122$ | $n_3 = 1.76167$ | $v_3 = 27.51$ |
| $r_6 =$ 18.0712 | | | |
| | $d_6 = 6.925$ | | |
| $r_7 =$ −777.9072 | | | |
| | $d_7 = 6.000$ | $n_4 = 1.48915$ | $v_4 = 70.20$ |
| $r_8 =$ 26.1270 | | | |
| | $d_8 = 3.550$ | $n_5 = 1.85504$ | $v_5 = 23.78$ |
| $r_9 =$ ∞ | | | |
| | $d_9 = 5.500$ | | |
| $r_{10} =$ ∞ (stop) | | | |
| | $d_{10} = 8.554$ | | |
| $r_{11} =$ −51.5023 | | | |
| | $d_{11} = 8.000$ | $n_6 = 1.48915$ | $v_6 = 70.20$ |
| $r_{12} =$ −21.7746 | | | |
| | $d_{12} = 2.770$ | $n_7 = 1.72733$ | $v_7 = 29.23$ |
| $r_{13} =$ −40.3016 | | | |
| | $d_{13} = 7.247$ | | |
| $r_{14} =$ −67.8304 | | | |
| | $d_{14} = 1996$ | $n_8 = 1.81077$ | $v_8 = 40.95$ |
| $r_{15} =$ 54.5438 | | | |
| | $d_{15} = 6.450$ | $n_9 = 1.48915$ | $v_9 = 70.20$ |
| $r_{16} =$ −34.3833 | | | |
| | $d_{16} = 0.150$ | | |
| $r_{17} =$ 71.6619 | | | |
| | $d_{17} = 7.466$ | $n_{10} = 1.49845$ | $v_{10} = 81.61$ |
| $r_{18} =$ −46.2821 | | | |
| | $d_{18} = D_1$ (variable) | | |
| $r_{19} =$ 59.3408 | | | |
| | $d_{19} = 7.224$ | $n_{11} = 1.48915$ | $v_{11} = 70.20$ |
| $r_{20} =$ ∞ | | | |
| | $d_{20} = 2.700$ | | |
| $r_{21} =$ ∞ | | | |
| | $d_{21} = 5.260$ | | |
| $r_{22} =$ ∞ | | | |
| | $d_{22} = 47.000$ | $n_{12} = 1.57124$ | $v_{12} = 56.33$ |
| $r_{23} =$ ∞ | | | |
| | $d_{23} = 1.000$ | $n_{13} = 1.51825$ | $v_{13} = 64.15$ |
| $r_{24} =$ ∞ | | | |
| | $d_{24} = 2.910$ | | |
| $r_{25} =$ ∞ | | | |
| | $d_{25} = 0.900$ | $n_{14} = 1.52736$ | $v_{14} = 64.55$ |
| $r_{26} =$ ∞ | | | |

| object distance | −4493.6937 | −1345.0000 | −440.0000 | −220.0000 |
|---|---|---|---|---|
| D1 | 11.1791 | 12.4568 | 15.3845 | 23.5175 | 34.4631 |

$|f_F/f_R| = 1.386$, $|f_R/f_I| = 0.102$, $|f_S/f_R| = 1.000$
$|f_1/f_F| = 0.922$, $|f_2/f_F| = 0.313$, $SF_P = -1.000$
$|f_R/f_P| = 0.348$, $|f/EX| = 0.042$ wherein the reference symbols $r_1$, $r_2$, ... represent radii of curvature on surfaces of respective lens components, the reference symbols $d_1$, $d_2$, ... designate thicknesses of the respective lens components and airspaces reserved therebetween, the reference symbols $n_1$, $n_2$, ... denote refractive indices of the respective lens components for the e-line, and the reference symbols $v_1$, $v_2$, ... represent Abbe's numbers of the respective lens components for the d-line.

The first embodiment has a composition illustrated in FIG. 1, or is composed, in order from the object side, of a front lens group F which has a negative refractive power as a whole and a rear lens group R which has a positive refractive power as a whole. The front lens group F consists, in order from the object side, of a first lens unit G1 which is composed of a positive lens component and a second lens unit G2 which is composed of two negative lens components: the second lens unit G2 being composed, in order from the object side, of a negative meniscus lens component having a concave surface on the image side and a biconcave lens component. The rear lens group R consists, in order from the object side, of a third lens unit G3 which is composed of a cemented lens component consisting of a negative lens element and a positive lens element, a stop, and a cemented lens component consisting of a positive meniscus lens element having a concave surface on the object side and a negative meniscus lens element having a concave surface on the object side, a fourth lens unit G4 which is composed of a cemented lens component consist of a biconcave lens element and a biconvex lens element, and a fifth lens unit G5 which is composed of two positive lens components.

The positive refractive power distributed in the first lens unit G1 of the front lens group F corrects the remarkable negative distortion produced by the front lens group F, the rear lens group R is composed of the third positive lens unit G3, the fourth negative lens unit G4 and the fifth positive lens unit G5 to distribute refractive powers as in the so-called triplet type, the third lens unit G3 lowers the axial rays which are diverged by the front lens group to suppress production of spherical aberration in particular, the fourth lens unit G4 corrects the negative spherical aberration, etc. which are produced by the rear lens group, and the fifth lens unit G5 functions to locate an exit pupil at a nearly infinite distance or an adequately long distance.

In the first embodiment, planar glass plates which are disposed on the image side of the lens system represent low pass filters, infrared cut filters, color separating prisms or optical path splitting prisms, trimming filters and so on.

As shown in the numerical data, the first embodiment is focused by broadening an airspace reserved between a lens component Lp disposed on the image side and a lens component disposed therebefore.

The first embodiment has a back focal length of 46.9 mm in terms of air (in optical path length) which is long enough to dispose the low pass filters, infrared cut filters, color separating prisms, trimming filters and so on as shown in FIG. 1. Further, the first embodiment has optical performance high enough for use with image pickup devices on which small pixels are arranged.

Figure 2:
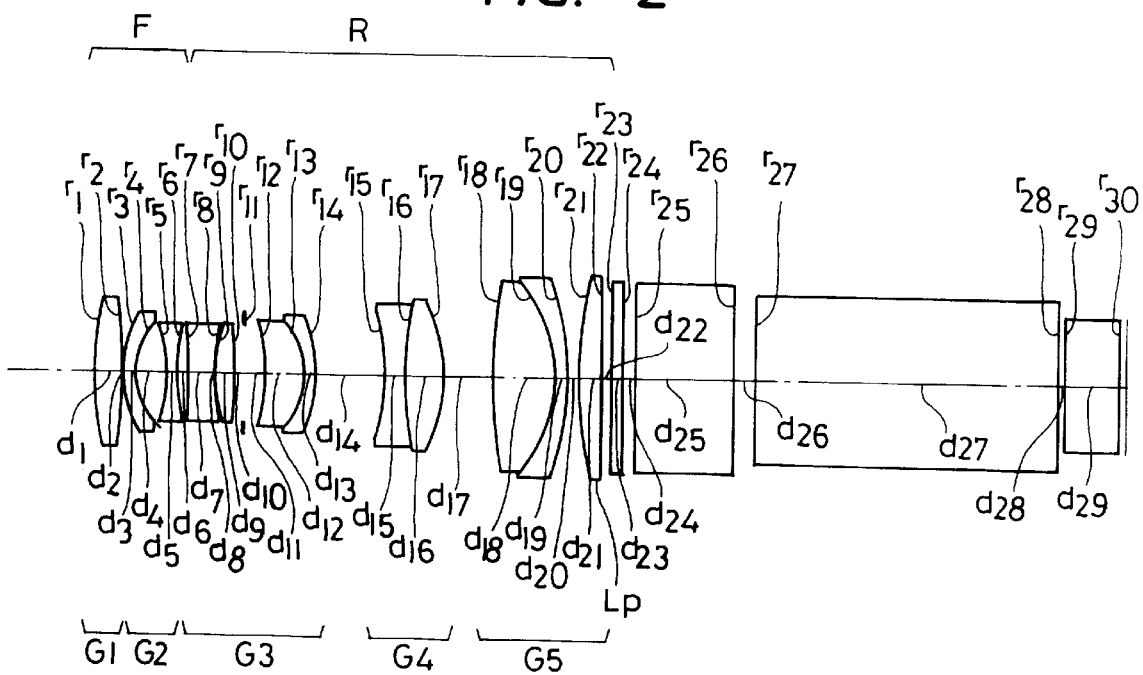

The second embodiment has a composition illustrated in FIG. 2, or is different from the first embodiment in that the second embodiment uses a third lens unit G3 of a rear lens group R which is composed, in order from the object side, of a negative lens component, a positive lens component, a stop, and a cemented lens component consisting of a positive meniscus lens elements having a concave surface on the object side and a negative meniscus lens element having a concave surface on the object side, and a fifth lens unit G5 of the rear lens group R which is composed of a cemented lens component consisting of a biconvex lens element and a negative meniscus lens element having a concave surface on the object side. Speaking more concretely, the negative lens element and the positive lens element which are disposed on the object side in the third lens unit G3 are cemented to each other in the first embodiment, but the second embodiment is different in that the negative lens component and the positive lens component are disposed separately with a slight airspace reserved therebetween on the object side in the third lens unit G3 and that the lens component disposed on the object side in the fifth lens unit G5 of the rear lens group is not a single lens element but a cemented lens component consisting of the biconvex lens element and the negative meniscus lens element having the concave surface on the object side.

The second embodiment enhances aberration correcting freedom by composing the third lens unit G3 of the rear lens group R, in order from the object side, of the negative lens component, the positive lens component, the stop and the cemented lens component, and separating the negative lens element and the positive lens element which are disposed on the object side of the stop slightly from each other. Further, the second embodiment corrects chromatic aberration sufficiently favorably and has high optical performance, though it is made of a relatively inexpensive glass material, owing to the fact that the fifth lens unit G5 of the rear lens group R is composed, in order from the object side, of the cemented lens component consisting of the positive lens element and the negative meniscus lens element having the concave surface on the object side, and the positive lens component Lp, or the cemented lens component is used in the fifth lens unit G5.

Figure 3:
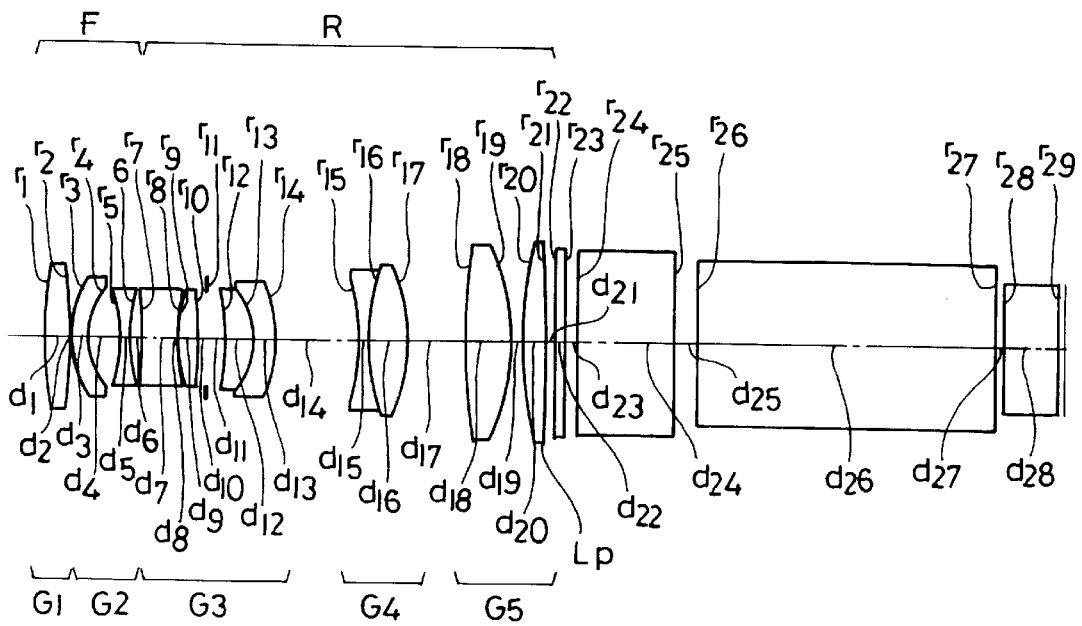

The third embodiment has a composition illustrated in FIG. 3, or is different from the first embodiment in that the third embodiment uses a third lens unit G3 of a rear lens group R which is composed, in order from the object side, of a negative lens component, a positive lens component, a stop, and a cemented lens component consisting of a positive meniscus lens element having a concave surface on the object side and a negative meniscus lens element having a concave surface on the object side. In other words, the third embodiment is different from the first embodiment in that the negative lens component and the positive lens component which are disposed on the object side in the third lens unit G3 are not cemented but disposed with a slight airspace reserved therebetween in the third embodiment.

The third embodiment is also an example wherein aberration correcting freedom is enhanced by reserving a slight airspace between the negative lens component and the positive lens component which are disposed on the object side in the third lens unit G3.

Figure 4:
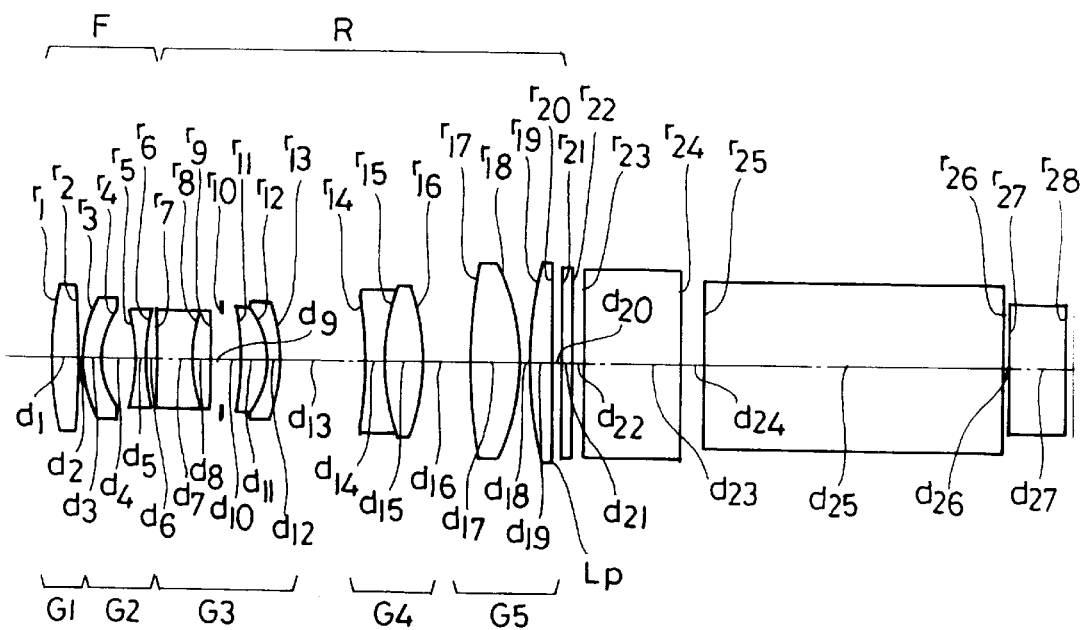

The fourth embodiment has a composition illustrated in FIG. 4 which is similar to that of the first embodiment.

Figure 5:
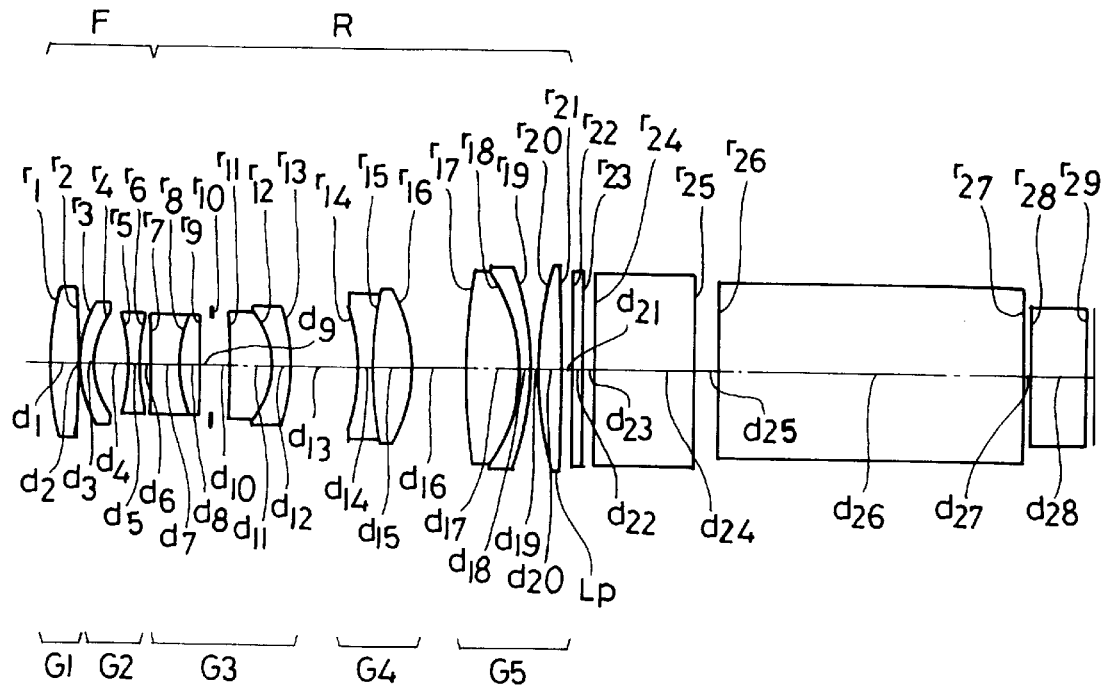

The fifth embodiment has a composition illustrated in FIG. 5. Differently from the first embodiment, the fifth embodiment adopts a fifth lens unit G5 of a rear lens group R which is composed, in order from the object side, of a cemented lens component consisting of a biconvex lens element and a negative meniscus lens element having a concave surface on the object side, and a positive lens component Lp. That is, the fifth embodiment is different from the first embodiment in that the former uses the cemented lens component on the object side in the fifth lens unit G5, whereas the latter uses the lens component consisting of a single positive lens element.

The fifth embodiment is an example of lens system which has optical performance enhanced by favorably correcting chromatic aberration with a relatively inexpensive glass material by using the cemented lens component in the fifth lens unit G5 as in the second embodiment.

Figure 6:
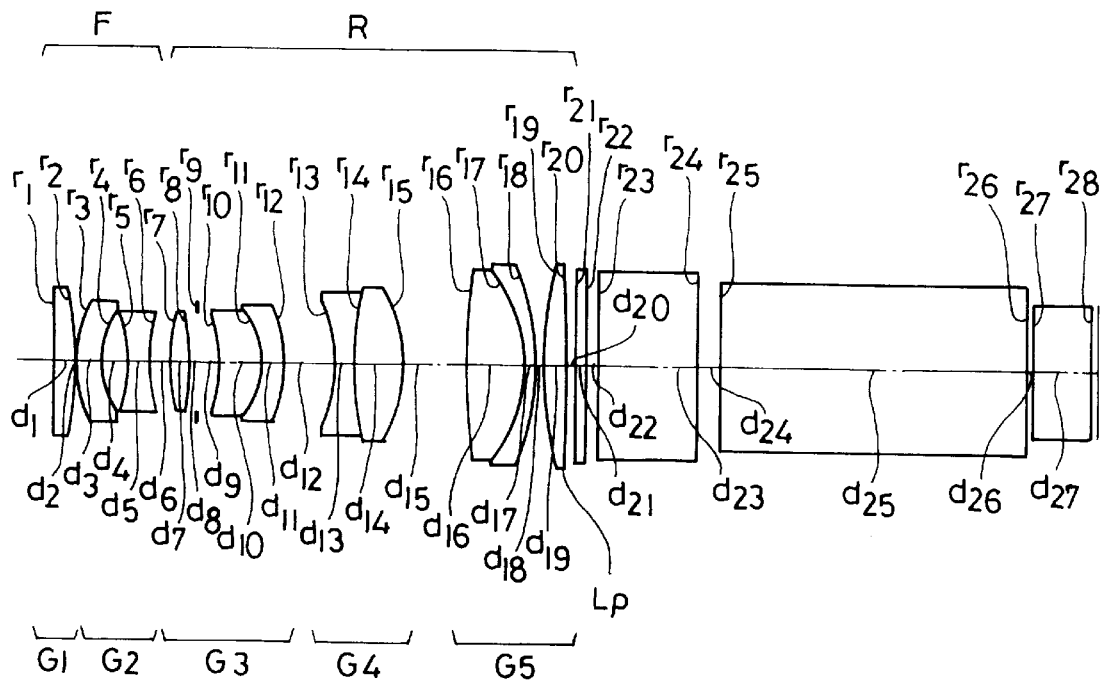

The sixth embodiment has a composition illustrated in FIG. 6. Differently from the first embodiment, the sixth embodiment uses a third lens unit G3 of a rear lens group R which is composed of a biconvex lens component, a stop, and a cemented lens component consisting of a positive meniscus lens element having a concave surface on the object side and a negative meniscus lens element having a convex surface on the object side, and a fifth lens unit G5 of the rear lens group R which is composed of a cemented lens component consisting of a biconvex lens element and a negative meniscus lens element having a concave surface on the object side, and a lens component Lp. That is, the sixth embodiment is different from the first embodiment in that the former uses a single positive lens element before the stop in the third lens unit G3 of the rear lens group R and the cemented lens component on the object side in the fifth lens unit G5.

The sixth embodiment is an example wherein the third lens unit G3 of the rear lens group R is composed, in order from the object side, of the positive lens component, the stop and the cemented lens component, or only a lens component is disposed on the object side of the stop to reduce a number of lens components. Further, chromatic aberration is corrected by using the cemented lens component in the fifth lens unit G5 of the rear lens group R as in the second embodiment so that high optical performance is obtained with an inexpensive glass material.

Figure 7:
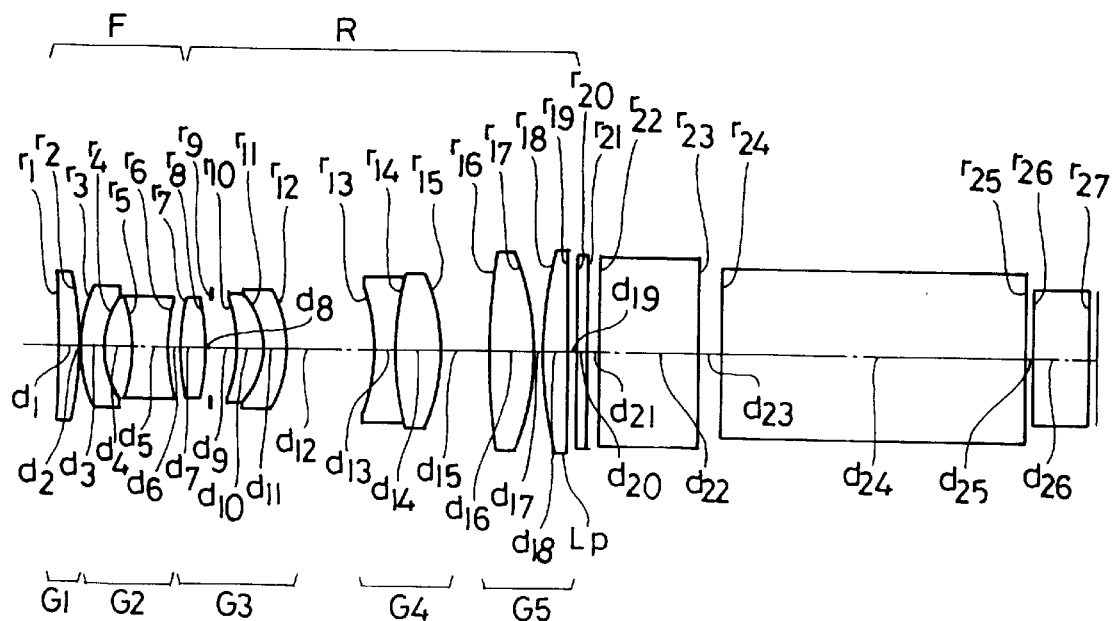

The seventh embodiment is composed as illustrated in FIG. 7. Differently from the first embodiment, the seventh embodiment adopts a third lens unit G3 of a rear lens group R which is composed, in order from the object side, of a positive lens component, a stop, and a cemented lens component consisting of a positive meniscus lens element having a concave surface on the object side and a negative meniscus lens element having a concave surface on the object side. That is, the seventh embodiment is different from the first embodiment in that the lens component disposed on the object side of the stop in the third lens unit G3 of the rear lens group R is composed of a single positive lens element.

Like the sixth embodiment, the seventh embodiment is an example of lens system in which a single lens component of a third lens unit G3 is disposed on the object side of a stop to reduce a number of lens component, or which is composed of an extremely small number of lens components.

Figure 8:
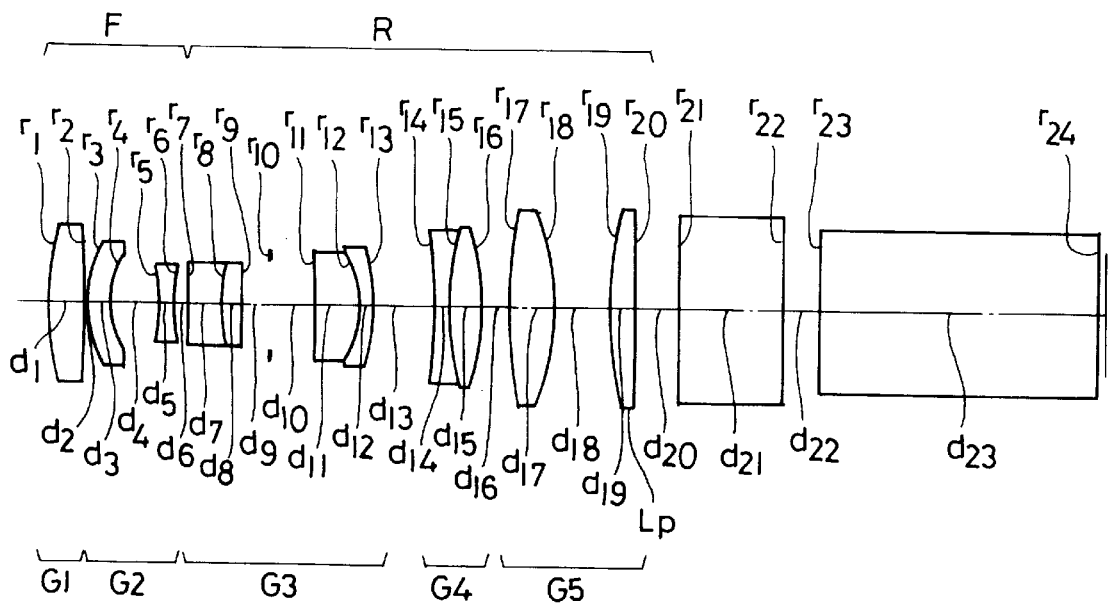

The eighth embodiment has a composition illustrated in FIG. 8, which is similar to that of the first embodiment.

The eighth embodiment is configured so as to have a sufficiently long back focal length so that prisms or the like and optical members can be disposed with sufficient margins. That is, the eighth embodiment has a back focal length long enough to interpose an optical element(s) such as a low pass filter(s), an infrared cut filter(s), a color separating prism(s) or an optical path splitting prism(s) between the lens system and image pickup devices.

Further, the eighth embodiment is focused by broadening an airspace reserved between a lens component disposed on the image side and lens component disposed on the object side thereof, thereby having optical performance high enough to permit using image pickup devices on which small pixels are arranged within a range from infinite distance to an extremely short distance at which macroscopic photographing is possible.

Figure 9:
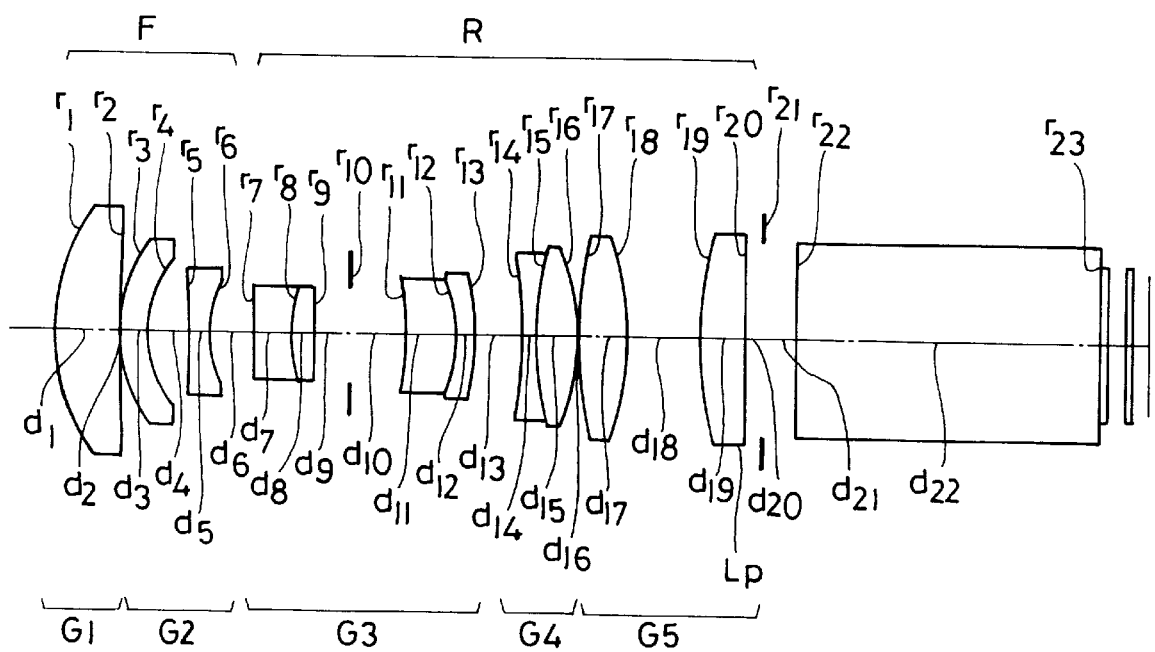

The ninth embodiment has a composition illustrated in FIG. 9, which is similar to that of the first embodiment. The ninth embodiment is an example wherein optical members such as prisms are thinned and axial rays are maintained low on lens components which are disposed on the image side of a stop in the lens system, thereby reducing diameters of the lens component and sizes of mechanical members such as a lens mount. Reversely, diameters of lens components which are disposed on the object side of the stop are slightly enlarged to obtain a sufficient amount of marginal rays.

Out of the embodiments described above, the second through eighth embodiments are lens systems which have back focal lengths longer than that of the first embodiment and allow to dispose a plurality of the so-called color separating prisms, single-lens type optical viewfinders and optical path splitting prisms which are used for automatic focusing and automatic exposure.

We claim:

1. A lens system comprising in order from the object side: a front lens group which has a negative refractive power as a whole; and a rear lens group which has a positive refractive power as a whole, wherein said front lens group is composed, in order from the object side, of a first lens unit which is composed only of a positive lens component(s) and a second lens unit which is composed only of a negative lens component(s), wherein said rear lens group is composed, in order from the object side, of a third lens unit which has a positive refractive power as a whole, a fourth lens unit which has a negative refractive power as a whole and a fifth lens unit which has a positive refractive power as a whole, and wherein said lens system satisfies the following conditions:

$$0.3<|f_F/f_R|<1.5 \quad (1)$$

$$0.05<|f_R/f_4|<0.8 \quad (2)$$

$$0.8<|f_5/f_R|<1.5 \quad (3)$$

wherein the reference symbols $f_F$, $f_R$, $f_4$ and $f_5$ represent focal lengths of the front lens group, the rear lens group, the fourth lens unit in the rear lens group and the fifth lens unit in the rear lens group respectively.

2. A lens system according to claim 1 satisfying the following conditions (4) and (5):

$$0.8<|f_1/f_F|<5.0 \quad (4)$$

$$0.2<|f_2/f_F|<0.9 \quad (5)$$

wherein the reference symbol $f_F$ represents a focal length of the front lens group, and the reference symbols $f_1$ and $f_2$ designate focal lengths of the first lens unit and the second lens unit respectively in the front lens group.

3. A lens system according to claim 1, wherein the fourth lens unit in the rear lens group is composed of a cemented lens component consisting, in order from the object side, of a negative lens element and a positive lens element.

4. A lens system according to claim 1, wherein the second lens unit comprises at least two negative lens components: a negative meniscus lens component and a biconcave lens component in order from the object side.

5. A lens system according to claim 1, wherein a lens component which is disposed on the image side in the rear lens unit is a positive lens component satisfying the following condition (6):

$$-1.3<SF_P<-0.5 \quad (6)$$

wherein the reference symbol $SF_P$ represents a shaping factor of the positive lens component.

6. A lens system according to claim 1, wherein the third lens unit comprises, in order from the object side, a lens component which comprises at least a positive lens element, and a cemented lens component which consists of a positive meniscus lens element having a concave surface on the object side and a negative meniscus lens element having a concave surface on the object side.

7. An image pickup apparatus equipped with a lens system as claimed in claim 1.

8. A lens system according to claim 3, wherein the fourth lens unit is composed of a cemented lens component which consists, in order from the object side, of a biconcave lens element and a biconvex lens element.

9. A lens system according to claim 5, wherein the lens system is focused from an object located at infinite distance to an object located at a short distance by broadening an airspace reserved between a positive lens component disposed on the image side in the lens system and the lens unit disposed on the object side of said positive lens component, and said positive lens component satisfies the following condition (7):

$$0.1<|f_R/f_P|<0.55 \quad (7)$$

wherein the reference symbol $f_P$ represents a focal length of said positive lens component.

10. A lens system according to claim 9, wherein said positive lens component is kept stationary for focusing the lens system from an object located at infinite distance to an object located as a short distance.

11. A lens system according to claim 2, 3, 4, 6, 7 or 8, wherein a lens component which is disposed on the image side in the rear lens unit is a positive lens component satisfying the following condition (6):

$$-1.3<SF_P<-0.5 \quad (6)$$

wherein the reference symbol $SF_P$ represents a shaping factor of the positive lens component.

12. A lens system according to claim 11, wherein the lens system is focused from an object located at infinite distance to an object located at a short distance by broadening an airspace reserved between a positive lens component disposed on the image side in the lens system and the lens unit disposed on the object side of said positive lens component, and said positive lens component satisfies the following condition (7):

$$0.1<|f_R/f_P|<0.55 \quad (7)$$

wherein reference symbol $f_P$ represents a focal length of said positive lens component.

13. A lens system according to claim 12, wherein said positive lens component is kept stationary for focusing the lens system from an object located at infinite distance to an object located as a short distance.

14. A lens system according to claim 2, 3, 6, 7 or 8 wherein the second lens unit comprises at least two negative lens components: a negative meniscus lens component and a biconcave lens component in order from the object side.

15. A lens system according to claim 2, 3 or 7 wherein the third lens unit comprises, in order from the object side, a lens component which comprises at least a positive lens element, and a cemented lens component which consists of a positive meniscus lens element having a concave surface on the object side and a negative meniscus lens element having a concave surface on the object side.

16. A lens system according to claim 2, wherein the fourth lens unit in the rear lens group is composed of a cemented lens component consisting, in order from the object side, of a negative lens element and a positive lens element.

17. A lens system according to claim 16, wherein the fourth lens unit is composed of a cemented lens component which consists, in order from the object side, of a biconcave lens element and a biconvex lens element.

18. An image pickup apparatus equipped with a lens system as claimed in claim 2.

19. An image pickup apparatus equipped with a lens system as claimed in claim 3.

* * * * *